United States Patent

French

[15] 3,646,691
[45] Mar. 7, 1972

[54] FISHING SIMULATOR

[72] Inventor: Roy E. French, 12644 Peacock Road, Bath Township, Clinton County, Mich. 49236

[22] Filed: Oct. 30, 1969

[21] Appl. No.: 872,495

[52] U.S. Cl. ............................................. 35/29 R, 272/1 B
[51] Int. Cl. ....................................................... G09b 9/00
[58] Field of Search .................... 272/1 B, 1 R; 273/1 R, 140; 46/91, 92; 43/17.2, 44.87, 44.97, 24, 17; 35/29 R

[56] References Cited

UNITED STATES PATENTS

| 1,116,721 | 11/1914 | Meder | 43/24 |
| 1,769,488 | 7/1930 | Buschor | 273/140 UX |
| 2,393,726 | 1/1946 | Yejoff | 273/1 R X |
| 2,490,669 | 12/1949 | Burke | 43/17 |
| 2,593,716 | 4/1952 | Allen | 43/17.2 |
| 2,776,516 | 1/1957 | Jennette | 43/24 |

*Primary Examiner*—Harland S. Skogquist
*Attorney*—Miller, Morris, Pappas & McLeod

[57] ABSTRACT

A device for simulating the sport of fishing which can be used as an educational toy for children or as a novelty item for fishing enthusiasts. It comprises a fishing rod, fishing line, float, and a nonbuoyant first weight as a fish. A second weight, slidably attached to the fishing line, is releasably maintainable so that its weight does not come to bear on the buoyancy of the float and first weight when immersed in water. Upon its release, the second weight falls along the fishing line, causing the float to sink, thereby simulating the striking of a fish at the end of the fishing line.

10 Claims, 3 Drawing Figures

PATENTED MAR 7 1972 3,646,691

INVENTOR
ROY E. FRENCH
BY
ATTORNEYS

FISHING SIMULATOR

BACKGROUND OF THE INVENTION

This invention concerns a toy or novelty device which simulates the sport of fishing. As a toy it gives enjoyment to small children who greatly enjoy the sport of fishing even though it be of pretending nature. By means of this toy, mentally retarded children and the like, as well as healthy children, can receive pleasure, and, further, can be given experience in reacting physically to their observations.

Further, the toy can be a novelty device given in a joking attitude to a fishing enthusiast.

SUMMARY OF THE INVENTION

This invention comprises a pole serving as a fishing pole, one end of which serves as a handle, a line serving as a fishing line, one end of which is attached to the other end of the pole, a nonbuoyant weight attached to the other end of the fishing line, a float attached to the fishing line intermediate the first weight and the end of the pole, sufficiently buoyant to float on water and to suspend the first weight when immersed in water, a second weight, slidably attached to the fishing line intermediate the first weight and the end of the pole and releasably maintainable in a position above the first weight when the float and first weight are immersed in water, the second weight being sufficiently nonbuoyant so as to overcome the buoyancy of the float and first weight in water when the second weight is released from maintained position. When the second weight is maintained it exerts no force against the buoyancy of the float and when it is released from its maintained position it falls freely and exerts sufficient force to overcome the buoyancy of the float.

DESCRIPTION OF THE INVENTION

Figure 1:
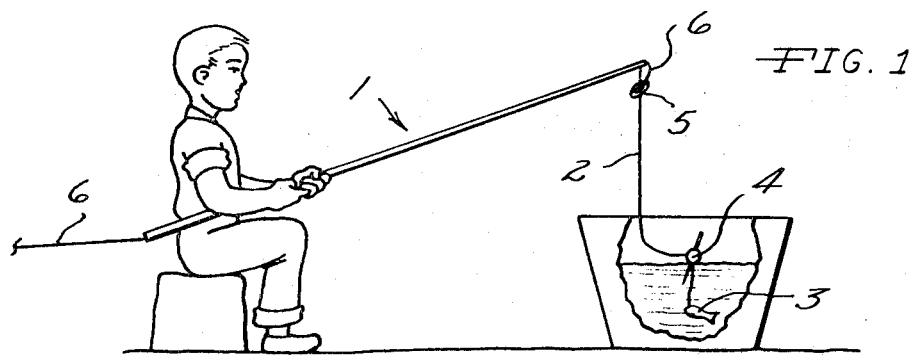
FIG. 1 shows the invention in use with the float and first weight immersed in water and the second weight maintained in position above the float, intermediate the float and the end of the fishing pole, by means of a second line attached to the second weight and passing through a hole extending the length of the fishing pole and out the handle of the pole.
Figure 2:
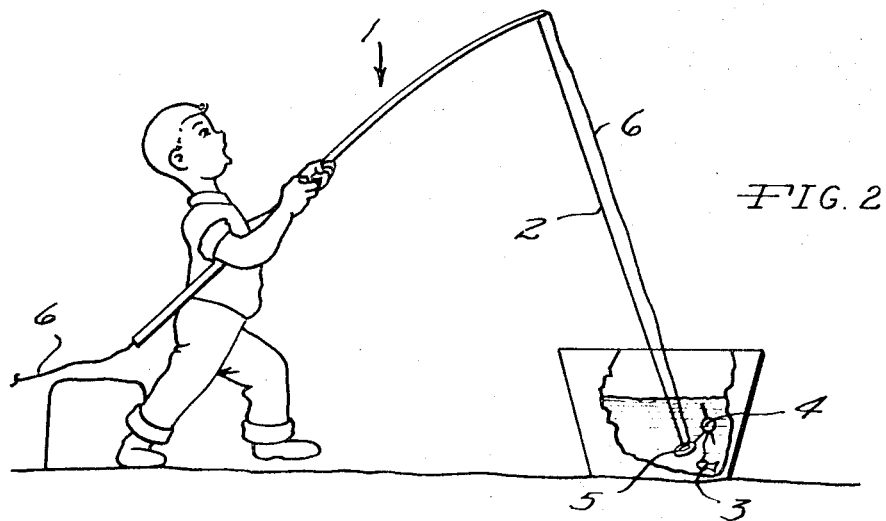
FIG. 2 illustrates the invention after the second weight has been allowed to fall along the fishing line into the water, thereby causing the float to sink.

Referring to the drawings, more particularly FIGS. 1 and 2, the invention includes a pole 1 serving as a fishing pole, one end of which serves as a handle. At the other end of the pole 1, a line 2 is attached and serves as the fishing line. To the other end of fishing line 2 is attached a first weight 3. Weight 3 is of such weight and shape that it is sufficiently nonbuoyant to sink when immersed in water. A float 4 is attached to fishing line 2, intermediate the weight 3 and the end of the pole 1. The float 4 is sufficiently buoyant to float in water and to suspend weight 3 in water.

A second weight 5 is slidably attached to fishing line 2, intermediate float 4 and the end of the pole 1. That is, it is attached to line 2 in a manner which permits the weight to slide along the line. As illustrated in FIGS. 1 and 2 this can be done by passing line 2 through a hole in the weight 5. Among other obvious ways of accomplishing this, the line 2 can be passed through the hole of an eye attached to weight 5. Weight 5 is sufficiently nonbuoyant such that when it is allowed to fall along line 2 toward the float 4, and into the water it causes the float 4 to sink in water. The second weight 5 can also be identified as the sliding weight 5.

In FIGS. 1 and 2, it is shown that a second line 6 is used to control the position of sliding weight 5 along the fishing line 2. One end of line 6 is attached to sliding weight 5. The line 6 passes through a hole extending substantially the length of pole 1, the other end of line 6 being in the vicinity of the handle end of the pole 1.

Figure 3:
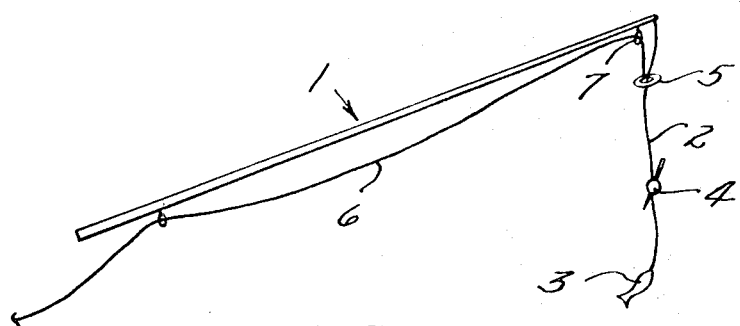
FIG. 3 illustrates another form of the invention wherein the line attached to the second weight is attached to the pole by means of an eye attached to the pole near its end.

FIG. 3 illustrates another manner in which line 6 is attached to the pole 1 at the end opposite the handle end of the pole. The line 6 passes through the eye 7 attached to the pole near the end opposite the handle end. Optionally, additional eyes can be attached along the length of the pole through which line 6 passes, to place the other end of line 6 in the vicinity of the handle end of the pole. Alternatively, the other end of line 6 can be brought to a location remote from the handle end of the pole, from where line 6 can be controlled.

Another way in which line 6 can be attached to the pole 1 is by means of a small pulley, through which line 6 passes, attached to the pole 1 near its end opposite the handle end. Still another way is by passing line 6 through a hole in the pole 1 near its end. In all of these ways for attaching the line 6 to the pole near its end it will be seen that line 6 is slidably attached so that it runs freely when it is released to allow weight 5 to fall. Alternatively stated, these are examples of the many ways for depending line 6 as a reciprocating line depending from the pole 1 at or near the end of the pole opposite its handle end.

For use of the invention, the user holds the pole at its handle end. By means of line 6, the user or an assistant or accomplice maintains sliding weight 5 in a position above float 4. The first weight 3 and the float 4 are immersed in water. To simulate the striking of a fish at the end of the fishing line, line 6 is released, allowing the sliding weight 5 to fall along fishing line 2, toward the float 4 and into the water and causing the float 4 to sink. The user reacts by raising the pole and pulling the float and weights from the water.

It will be readily understood that the pole 1 can be a simple wood, plastic or metal pole, a cane fishing pole, or an elaborate fly rod or casting rod and reel, or the like. When a fly rod or casting rod having line guides is used, line 6 can be conveniently passed through the line guides along with the fishing line 2.

Each or both of lines 2 and 6 can be string, flexible wire, or conventional fishing line of various types, including woven or braided line or monofilament line. Line 2 can be one line or composed of two segments, one segment connecting weight 3 and float 4 and the other segment connecting float 4 and the end of pole 1.

The float 4 can be a simple cork or wood float or it can be a commercially available fishing bobber. Preferably, it is attachable to the fishing line in a manner such that it can be easily adjusted along the fishing line to change the depth at which the first weight 3 is suspended in water. Commercially available fishing bobbers are constructed to permit this.

First weight 3 is nonbuoyant in water. Preferably, it is in the shape of a fish, the fishing line being attached at the mouth of the fish. However, any shape can be used, including, as a novelty, a mermaid shape or tire shape or the like.

Other means are contemplated for maintaining the sliding weight 5 in releasable position above the float. This can be done by means of a small, movable hook on the end of the pole, to which the weight can be hooked and which can be released by a wire or string running to the vicinity of the handle of the pole. This can also be done by means of an electromagnet attached to the end of the pole and a sliding weight 5 made of magnetically susceptible material. When electric potential in the electromagnet is cut off, the sliding weight 5 falls along the line 2. Wires to the electromagnet can lead to a switch at the handle of the pole or at a more remote location. Other means of accomplishing this will be apparent and are included.

The foregoing description of the invention and its manner of use has been in terms of a form wherein the sliding weight 5 is slidably attached to fishing line 2 intermediate the float 4 and the end of pole 1. It will be seen however that sliding weight 5 can also be slidably attached to fishing line 2 intermediate the float 4 and first weight 3. This is particularly true when a second line is used to control its position. When the first weight 3 and the sliding weight 5 and the float 4 are immersed in water, sliding weight 5 can be maintained above weight 3 by means of second line 6. While so maintained, the float 4 remains floating. When the sliding weight 5 is allowed to fall along line 2 until it comes to rest against weight 3, the residual buoyancy of float 4 is overcome, with the result that float 4 sinks, again simulating the striking of a fish at the end of fishing line 2.

It will be seen that all of the ways described for releasably maintaining the sliding weight 5 serve to depend sliding weight 5 from the end of the pole 1 such that its weight does not come to bear on float 4 until sliding weight 5 is released from its depending position.

In a preferred form of the invention, the sliding weight 5 is arranged to fall quickly, when released, and causes the float 4 quickly to sink, so that, to a user who is slow to observe, the cause of the sinking of the float 4 is not easily discernible. This can be done in at least two ways. In one way, the sliding weight 5 is slidably attached to line 2 by line 2 passing through a hole in sliding weight 5 at about its center. Line 2 is attached to the top of the float 4 and to the bottom of float 4 as it floats on the surface of water. As weight 5 falls, it is guided by line 2 to fall directly on top of float 4. Weight 5 is of size, shape, and color such that, after it has fallen quickly on to the top of float 4, weight 5 seems to lose its individuality and to become a part of the float 4.

As another way of accomplishing this preferred form, the sliding weight 5 is slidably attached to line 2 intermediate the float 4 and the first weight 3 as hereinbefore described. In the use of this form, the sliding weight 5 is below the surface of the water and more difficult to be observed by the user. It will be apparent that in either of these ways of accomplishing this preferred form of the invention there is cause for greater excitement on the part of a child user of the invention.

As stated hereinbefore, the device can be used as a toy for children or as a novelty device for fishing enthusiasts. Importantly, this device can be used as an aid in training small children and mentally retarded children to react to observations. Initially, such a child would learn to react to the sinking of the float. Subsequently, the child would come to learn that, as he observes the weight falling or as he observes the movement of the means which controls the position of the sliding weight, he would expect the float to sink. Thus, the device has important educational use.

The device having been described, many variations and modifications will be apparent which are within the scope of the invention, the scope being limited only as in the following claims:

I claim:

1. A toy simulating the sport of fishing comprising:
   a. a reelless pole, one end of the pole serving as a handle;
   b. a line serving as a fishing line, one end of which is attached to the end of the pole opposite the handle end;
   c. a baitless first weight, nonbuoyant in water, attached to the other end of the fishing line;
   d. a float attached to the fishing line intermediate the first weight and the end of the pole, sufficiently buoyant to float on water and to suspend the first weight when said first weight is immersed in water;
   e. a second weight, slidably attached to the fishing line intermediate the float and the end of the pole and releasably maintainable in a position above the float and first weight when said float is in the water and said first weight is immersed in water, the second weight being sufficiently nonbuoyant to overcome the buoyancy of the float and first weight in water when the second weight is released from its maintained position, whereby, when the second weight is released from its maintainable position it falls and overcomes the buoyancy of the float and first weight in water, thereby simulating the striking of a fish.

2. The toy of claim 1 wherein the first weight additionally comprises a simulated fish.

3. The toy of claim 1 wherein the second weight is releasably maintainable in position above the first weight by a second line attached at one end to the second weight and slidably attached to the pole near its end opposite the handle.

4. The toy of claim 1 wherein the second weight is slidably attached to the fishing line intermediate the float and the end of the pole and the second weight is releasably maintainable in a position above the float when the float and first weight are immersed in water by a second line attached at one end of the second weight and slidably attached to the pole near its end opposite the handle.

5. The toy of claim 4 wherein the second line passes through a hole in the pole extending substantially the length of the pole.

6. The toy of claim 4 wherein the second line is slidably attached to the pole by means of the line passing through a hole in the pole near its end.

7. The toy of claim 4 wherein the second line is slidably attached to the pole by means of an eye attached to the pole near its end, through which the second line passes.

8. The toy of claim 4 wherein the second line is slidably attached to the pole by means of a pulley attached to the pole near its end, through which the second line passes.

9. A toy simulating the sport of fishing comprising:
   a. a reelless pole, one end of the pole serving as a handle;
   b. a line serving as a fishing line, one end of which is attached to the end of the pole opposite the handle end;
   c. a baitless first weight, nonbuoyant in water, attached to the other end of the fishing line;
   d. a float attached to the fishing line intermediate the first weight and the end of the pole, sufficiently buoyant to float on water and to suspend the first weight when said first weight is immersed in water;
   e. a second weight, slidably attached to the fishing line intermediate the float and the end of the pole, sufficiently nonbuoyant to overcome the buoyancy of the float and first weight in water;
   f. means for releasably maintaining the second weight in a position above the first weight when the float and first weight are immersed in water, whereby when the second weight is released from its position above the float it falls along the fishing line until it overcomes the buoyancy of the float and first weight in water, causing the float to sink thereby simulating the striking of a fish.

10. The toy of claim 9 wherein said means for releasably maintaining the second weight is remote from said pole.

* * * * *